W. G. WACHS & R. L. GALLUP.
GLASS CONVEXING FURNACE.
APPLICATION FILED AUG. 18, 1913.
1,118,976.
Patented Dec. 1, 1914.
3 SHEETS—SHEET 2.
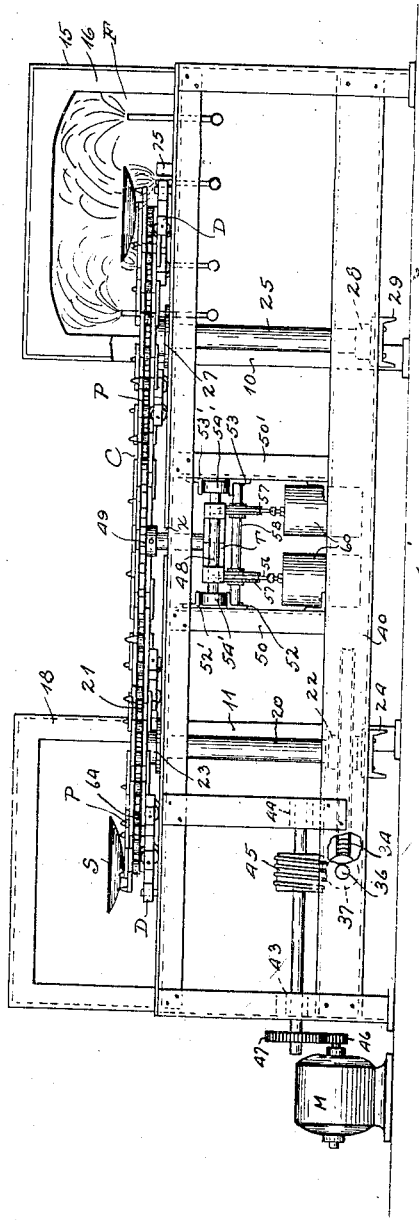

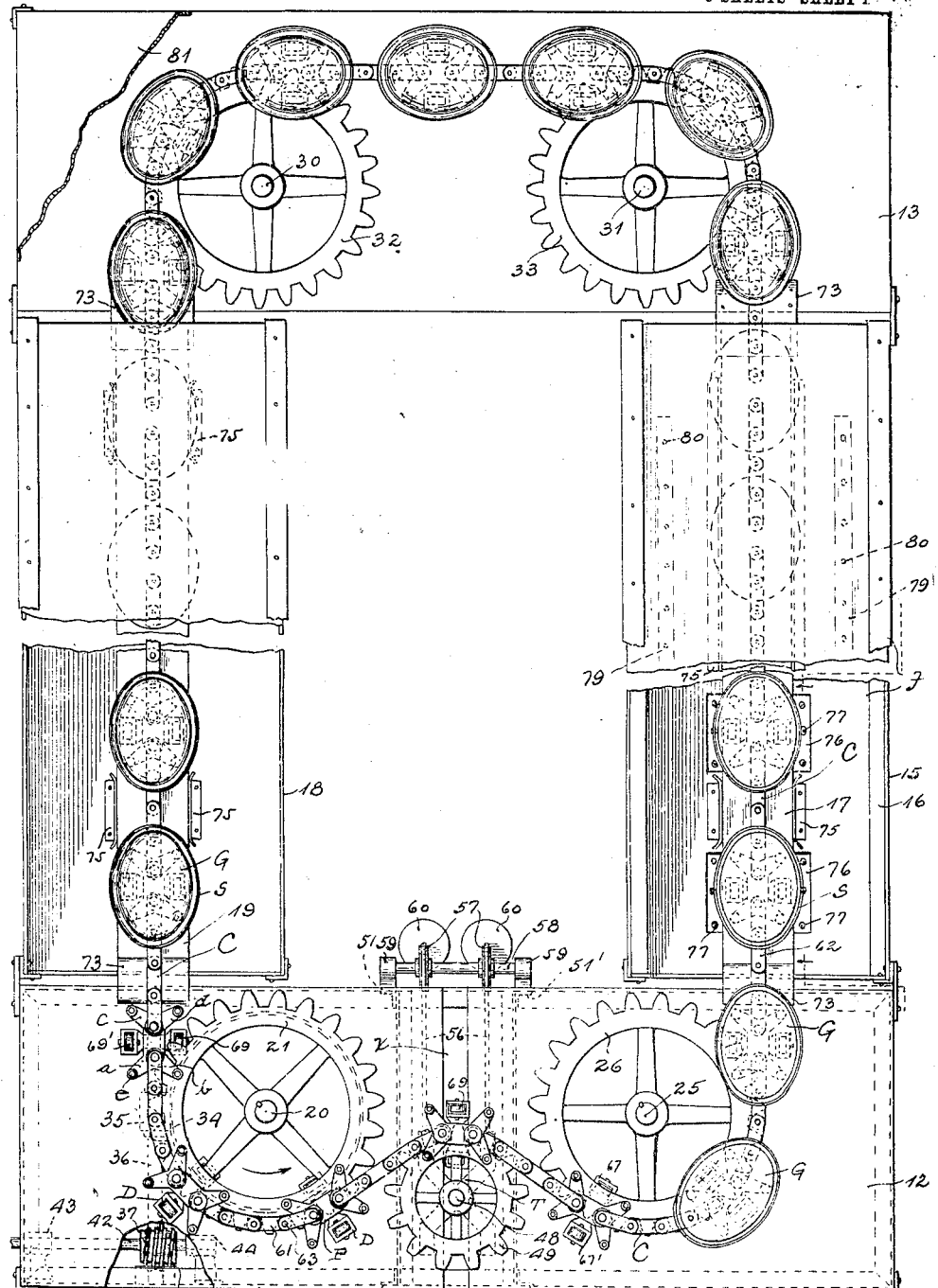

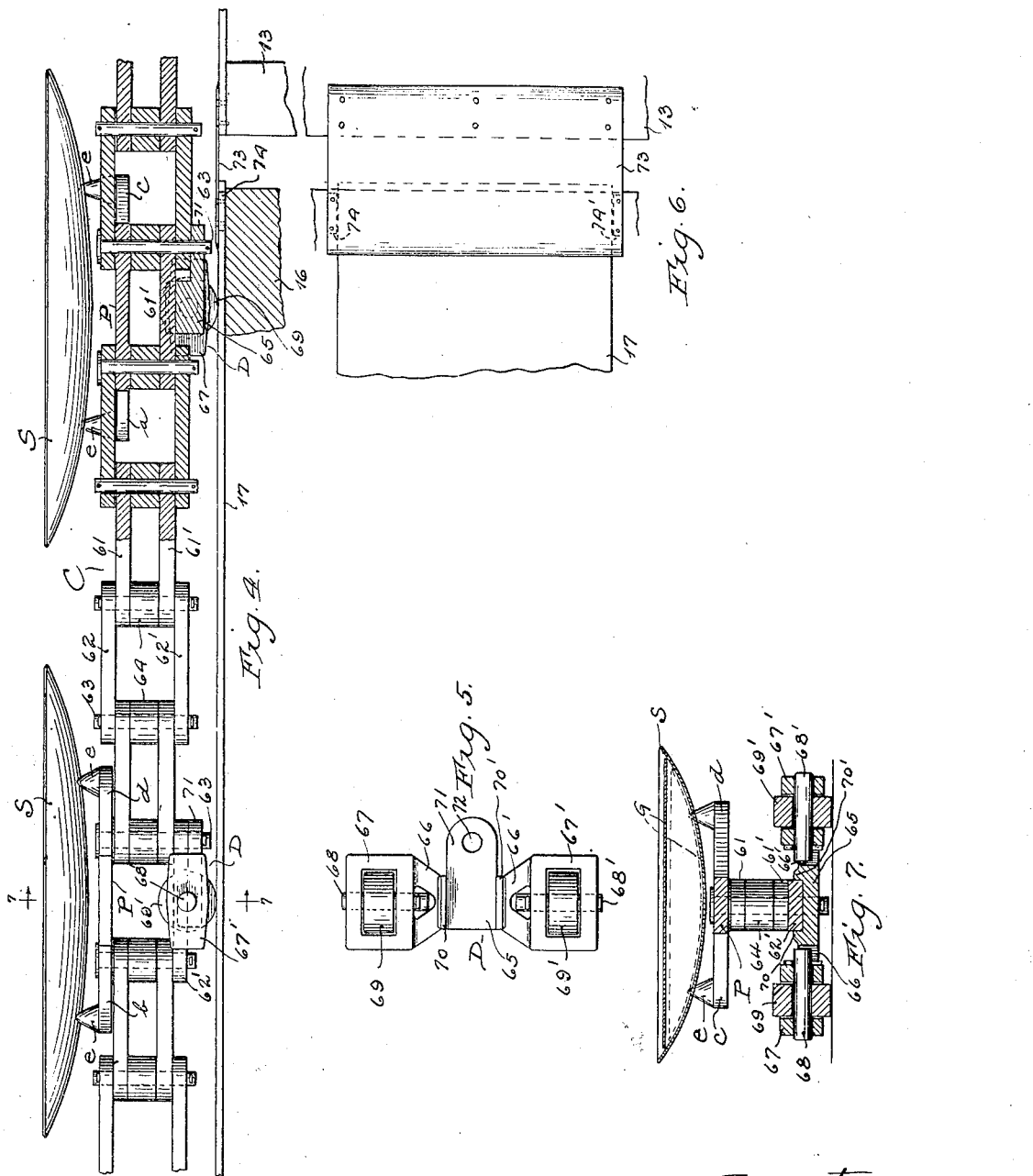

UNITED STATES PATENT OFFICE.

WALTER G. WACHS AND ROCKWELL L. GALLUP, OF CHICAGO, ILLINOIS, ASSIGNORS TO HERMAN MOLNER, OF COOK COUNTY, ILLINOIS.

GLASS-CONVEXING FURNACE.

1,118,976.  Specification of Letters Patent.  Patented Dec. 1, 1914.

Application filed August 18, 1913. Serial No. 785,191.

*To all whom it may concern:*

Be it known that we, WALTER G. WACHS and ROCKWELL L. GALLUP, citizens of the United States, residing at Chicago, county of Cook, and State of Illinois, have invented a new and useful Improvement in Glass-Convexing Furnaces, of which the following is a specification.

Our invention relates to glass convexing furnaces, particularly to such furnaces for convexing glass plates for picture frames. In this art straight panes of glass cut first usually to circular or elliptical form are laid on dished forming shells and are then heated sufficiently to sink into and against the shells to take on a convex form. Conveying mechanism which carries the shells and plates through heating zones in a furnace runway is provided. In prior furnaces the conveying mechanism, in the form of an endless belt or chain passes through the furnace and then back underneath the furnace, the glass plates being charged on to the shells at the receiving end and taken off at the delivery end, only the entrance part of the furnaces having heating mechanism so that the formed plates may have time to cool sufficiently for safe handling before being taken from the shells. Such prior mechanism is impractical and inefficient in many ways. It requires operators at each end, those to charge on the plates and those to take them off of the shells. Unnecessary strain is also placed on the conveyer mechanism as the chain must pass in inverted position below the furnace and thus carry the weight of the inverted shells if left thereon, or the shells would have to be removed with the convexed glasses at the delivery end thus increasing the labor and breakage. Again, in order to insure sufficient heating and cooling the furnace must be very long, necessitating a long room and considerable space which is, of course, very impractical. Additional and more or less complicated mechanism was also necessary to efficiently guide the inverted conveyer mechanism below the furnace. Furthermore, this lower half of the conveyer mechanism is idle all the time, the device operating, on this account alone, only at 50% efficiency.

Among the important objects of our invention are to provide construction and arrangement which will reduce the length of the furnace at least by one-half; to provide a construction and arrangement in which an endless conveyer belt or chain travels always in upright position, and is never inverted; to provide construction which will enable charging and unloading at only one end of the furnace, thus reducing by at least one-half, the number of operators; to provide an arrangement in which the conveyer mechanism travels in a horizontal plane through a furnace and a cooling tunnel or hood alongside and parallel with the furnace, charging and unloading taking place at a substantially common point at adjacent ends of the furnace and the cooling or annealing tunnel; to provide improved driving means for the conveyer chain; to provide improved means for automatically compensating for the expansion and contraction of the furnace proper, conveyer mechanism and tracks so that the movement and operation will be smooth and uniform at all times; to provide improved construction for the conveyer chain and shell supporting mechanism, the shell supports being themselves links forming part of the chain; to provide improved trucks for carrying the chain with minimum resistance over the tracks provided therefor; and in general to provide more simple, more practical and more efficient construction and arrangement in devices of the character referred to.

Referring to the accompanying drawings which illustrate the various features of our invention, Figure 1 is a plan view of the furnace, Fig. 2 is a front elevational view, Fig. 3 is a side view from plane 3—3, Fig. 1, Fig. 4 is an enlarged side view of the conveyer chain with part thereof in section, Fig. 5 is an enlarged plan view of one of the conveyer trucks, Fig. 6 is an enlarged plan view showing an expansion and contraction bridge arrangement, and Fig. 7 is a sectional view on plane 7—7 Fig. 4.

Referring to the drawings the supporting structure comprises two longitudinally extending tables 10 and 11, and two end tables 12 and 13, these tables being of any suitable construction but preferably of metal. The table 10 supports the furnace F of sheet metal 15 lined by fire resisting or refractory material 16, the floor of the furnace supporting a track 17 for the conveyer chain C, this track being a sheet metal strip.

The table 11 supports the hood or tunnel 18 of sheet metal whose floor supports a sheet metal track band 19 for the conveyer chain.

The front table 12 supports the driving mechanism for the conveyer chain. A vertical shaft 20 to whose upper end a driving sprocket wheel 21 is secured is journaled in lower bearing 22 and upper bearing 23, the lower bearing being supported on the cross beam 24 and the upper bearing being mounted on the top 12' of the table. Likewise a vertical shaft 25 securing at its upper end the sprocket wheel 26 is journaled in upper and lower bearings 27 and 28, the lower bearing being supported on cross beam 29.

The rear table 13 is of substantially the same construction as the front table 12 and vertical shafts 30 and 31 carrying respectively sprocket wheels 32 and 33 are journaled on the table in the same manner as the shafts 20 and 25. These sprocket wheels are in a horizontal plane with the track strips 17 and 19 and the conveyer chain passes about the wheels and centrally through the furnace and the annealing hood or tunnel, as shown.

The driving shaft 20 has secured to its lower end a driving worm wheel 34 engaged by the worm pinion 35 on transmission shaft 36 which at its front end carries a worm wheel 37, the shaft 36 being journaled in front and rear bearings 38 and 39 supported on beams 40 and 41 forming part of the structure of table 12. Above shaft 36 the shaft 42 is journaled in bearings 43 and 44 supported from table 12, the inner end of this shaft carrying the worm 45 meshing with worm wheel 37. The shaft 42 may be driven from any suitable source. As shown an electric motor M is the driving source, its pinion 46 meshing with gear 47 on the outer end of shaft 42. The gearing ratio between the motor and sprocket wheel 21 is such that the conveyer chain will progress comparatively slowly through the furnace and annealing hood.

Owing to the intense heat, the conveyer chain and its supporting structure will expand and contract, and in order to compensate for such expansion and contraction and to keep the chain reasonably taut, compensating mechanism is provided. This mechanism comprises a carriage T supporting a vertical shaft stub 48 on which is mounted the idler sprocket wheel 49 engaging with and against the outside of the conveyer chain between the sprocket wheels 21 and 26 on table 12. Front and rear vertical struts 50, 50' and 51, 51' on table 12 support lower and upper track beams 52, 53 and 52' 53' respectively. The carriage T has front and rear axles 54 and 55 carrying respectively wheels 54' and 55', these wheels riding between the track beams 52, 52' and 53, 53', as indicated, and keep the shaft 48 in vertical position. Extending rearwardly from the carriage T are cables 56, 56 which pass over pulleys 57, 57 on shaft 58 journaled in bearings 59, 59 secured to the rear side of table 12, weights 60, 60 hanging from the ends of the cables to exert pull on cables and carriage, which pull is transmitted through shaft 48 and sprocket wheel 49 to the chain section between the main sprocket wheels 21 and 26. As the chain expands the weights move down and the slack is taken up, and when the chain contracts the weights yield. There is thus always yielding lateral tension on the chain tending to keep it taut so that it will move uniformly and smoothly at all times. To allow the carriage to travel back and forth the table top 12' has the transverse slot X through which shaft 48 extends.

The construction of the conveyer chain and the shells for supporting the glass plates is best shown in Figs. 4, 5 and 7. The chain proper comprises inner and outer pairs of links 61, 61' and 62, 62' pivoted together at their ends by pins 63. Each pin, between the inner links, journals a roller 64, the length of the links corresponding with the pitch of the sprocket wheels so that the rollers may properly coöperate with the sprocket teeth. At regular intervals a link is omitted and a special link, in the form of a supporting frame P is substituted. Each frame has four arms $a$, $b$, $c$ and $d$ extending therefrom, each arm having at its end a vertical teat $e$, the four teats of each frame serving to support a dished shell S which may be circular, or ellipitical as shown. The frame P may replace only outer links 62, but in order to accommodate a greater number of frames and to increase the capacity of the furnace, it may be necessary to substitute frames for some of the inner links. As shown, alternate frames P replace inner links. One such arrangement is shown at the right of Fig. 4, and in order to have the shells S at a common level, the supporting teats $e$ of the inner link frames F are longer than those of the outer link frames P, as clearly shown.

A supporting truck D is provided for the chain under each shell supporting frame P, the construction of such trucks being clearly shown in Figs. 4, 5 and 7. The body 65 of the truck has side arms 66 and 66' terminating in rectangular bearing frames 67 and 67' for the axles 68 and 68' carrying the wheels 69 and 69' within the frames. The body 65 of the truck engages below the chain link and has confining ridges 70 and 70' engaging the sides of the link to hold the truck square with the link. A draft extension 71 from the body has the opening 72 through which passes the front pin of the link engaged by the truck. The truck is thus drawn along with the chain and held in proper alinement by the ridges 70 and 70'. Where the truck engages an inner link its body is made thicker as indicated at the right of Fig. 4. The link pins are sufficiently loose to prevent binding during expansion or contraction and the truck wheels are also sufficiently loose on their shafts to prevent binding. The track bands 17 and 19 are also free to expand and contract, and in order to avoid a gap in the conveyer path between the end tables and the furnace and hood, bridge plates 73 are provided, these plates being secured to the respective end tables as shown in Fig. 6 and extend over the track in the furnace or hood, the track being kept in longitudinal alinement by side guides 74, 74' extending from the bridge plate. The bridge plates are thin and their ends are well beveled in order that the trucks may travel freely thereover. In order to hold the chain to its track strips 17 and 19 in the furnace and hood, guide irons 75 are secured adjacent the track, these irons having flaring ends as shown.

The heating means for the furnace may be of any suitable construction and arrangement. As shown, openings 76 are provided through the furnace floor adjacent the track strip 17 and through these openings burners 77 project from gas feed pipes 78. These openings are only along the front section of the furnace so that flames are directed first against the undersides of the shells. Further along in the furnace openings 79 are provided closer to the sides of the furnace through which burners 80 extend, the flames issuing from these burners being deflected by the furnace walls downwardly against the top of the shells and the glass plates G therein. The shells and glass plates are thus highly heated and the originally straight glass plates will bend down into the shell and take the shape thereof. After leaving the furnace the formed plates are carried through the annealing hood 18 and are gradually cooled, and may be safely handled and removed when they reach the front table 12. If necessary one man could easily operate the furnace. It is more practical, however, to utilize two men, one to charge the straight plates on to the shells and the other to remove the formed plates from the shells and to store them away. The plates may be taken from the shells, or the shells themselves with the plates therein may be removed and empty shells substituted. Both men operate from table 12. A hood 81 is placed on the end table 13 to cover the conveyer and shells as they pass from the furnace to the hood 18, this end hood being preferably removable in order that the conveyer and sprocket wheels may be readily inspected.

We have thus produced a glass convexing furnace mechanism which is much more simple, practical and efficient than prior art devices of this class.

We do not desire to be limited to the precise structure and arrangement shown and described as changes and modifications may be possible which will still come within the scope of our invention.

We claim as follows:

1. In glass convexing mechanism, the combination of a furnace, an annealing tunnel alongside of and parallel with said furnace, tracks through said furnace and tunnel and tracks connecting the adjacent ends of said furnace and tunnel, an endless chain adapted to travel over said tracks, means for continuously driving said chain, and means on said chain for supporting glass panes to be formed.

2. In glass plate forming mechanism the combination of an endless conveyer chain adapted to travel in a horizontal plane, an endless track for said chain, a furnace surrounding part of said track, an annealing hood covering another part of said track, mechanism for continuously driving said chain, and supports on said chain for glass plates to be formed.

3. In glass plate convexing mechanism the combination of an endless horizontal track, a conveyer chain adapted to travel on said track, means on said chain for supporting glass plates to be convexed, a furnace surrounding part of said track for heating the plates as the chain travels therethrough, an annealing hood covering the major portion of the remainder of said track, and means for continuously driving said chain.

4. In a glass plate convexing mechanism, the combination of two transversely extending tables and two longitudinally extending tables extending between the respective ends of said transversely extending tables, said tables forming a continuous track, an endless conveyer chain arranged to be propelled over said track, glass disk supporting units carried by said chain, a furnace on one of said longitudinal tables for heating the glass disks passing therethrough, and an annealing hood on the other longitudinally extending table.

5. In glass plate convexing mechanism, the combination of two transversely extending tables, two longitudinally extending tables interposed between the respective ends of said transversely extending tables, said tables forming an endless track, an endless chain comprising glass disk supporting units provided with wheels for engaging said track, means mounted on one of said transversely extending tables for continuously propelling said chain, a furnace on one of said longitudinally extending tables for heating and convexing glass plates on the supporting units as they pass therethrough, and an annealing hood on said other longitudinally extending table.

In testimony whereof, we have signed our names to this specification in the presence of two subscribing witnesses this 12th day of August, A. D. 1913, at Chicago, Illinois.

WALTER G. WACHS.
ROCKWELL L. GALLUP.

Witnesses:
C. A. SHAW,
HERMAN MÖLNER.